United States Patent [19]

Willa

[11] Patent Number: 4,974,329

[45] Date of Patent: Dec. 4, 1990

[54] GONIOMETER

[76] Inventor: Siegfried Willa, Bahnhofstrasse 4, 3900 Brig, Switzerland

[21] Appl. No.: 326,524

[22] Filed: Mar. 21, 1989

[30] Foreign Application Priority Data

Mar. 25, 1988 [CH] Switzerland .................. 1137/88
Dec. 20, 1988 [CH] Switzerland .................. 4708/88

[51] Int. Cl.$^5$ .............................................. G01K 9/12
[52] U.S. Cl. ......................................... 33/391; 33/471; 33/421; 33/451
[58] Field of Search ................ 33/1 N, 421, 469, 391, 33/398, 437, 403, 451, 465, 471

[56] References Cited

U.S. PATENT DOCUMENTS

| | | | |
|---|---|---|---|
| 147,472 | 2/1874 | Bogy | 33/391 |
| 614,985 | 11/1898 | Ruffin | 33/421 |
| 721,274 | 2/1903 | Bankston | 33/421 |
| 905,249 | 12/1908 | Townsend | 33/470 |
| 1,128,673 | 2/1915 | Foner | 33/471 |
| 1,317,052 | 9/1919 | Spanier | 33/391 |
| 1,550,755 | 8/1925 | Steinle | 33/471 |
| 2,900,729 | 8/1959 | Basile | 33/451 |
| 2,966,743 | 1/1961 | Doudlah | 33/1 N |
| 4,358,898 | 11/1982 | Johnson | 33/1 N |
| 4,449,304 | 5/1984 | Underwood | 33/437 |

Primary Examiner—Thomas B. Will
Attorney, Agent, or Firm—Arnold, White & Durkee

[57] ABSTRACT

The goniometer (1) comprises a scale (203) having three sectors (204, 205, 206) in degrees, grads, and percent. A pointer arrangement (207) is disposed above the scale, and a central arbor bears a handle (208). Fixed in an extension (210) of the handle is a measuring rod (213) which can be used to transfer the angle indicated on the scale to an external item. The pointer arrangement can be locked via a mechanism by a slide (214) disposed in the handle when a locating mark (211 is situated over a pointer. The goniometer can be detachably connected to a measuring bar, to which an angle gauge (217) may also be secured.

16 Claims, 10 Drawing Sheets

GONIOMETER

This invention relates to measuring instruments, and more particularly to a goniometer of the type having a housing and a scale disposed within the housing.

The invention further relates to a bar to be detachably connected to the goniometer and to an angle gauge to be detachably connected to the bar.

It is an object of this invention to provide an improved goniometer by means of which the value read off can easily be transferred, e.g., to a drawing sheet or workpiece situated outside the goniometer.

Another object of this invention is to provide a goniometer in which the pointer arrangement can be freely rotated for setting an angular value to be measured and can be locked and released together with a transfer part for transferring a measured angular value by means of the transfer part.

To this end, in the goniometer according to the present invention, of the type initially mentioned, the improvement comprises a pointer arrangement pivotingly mounted in the region of the scale and a part pivotingly secured to a handle and projecting beyond the goniometer for transferring the angular values. A further improvement comprises locking means for selectively locking and releasing the transfer part together with the pointer arrangement.

Preferred embodiments of the invention and their use will now be described in detail with reference to the accompanying drawings, in which.

Figure 1:
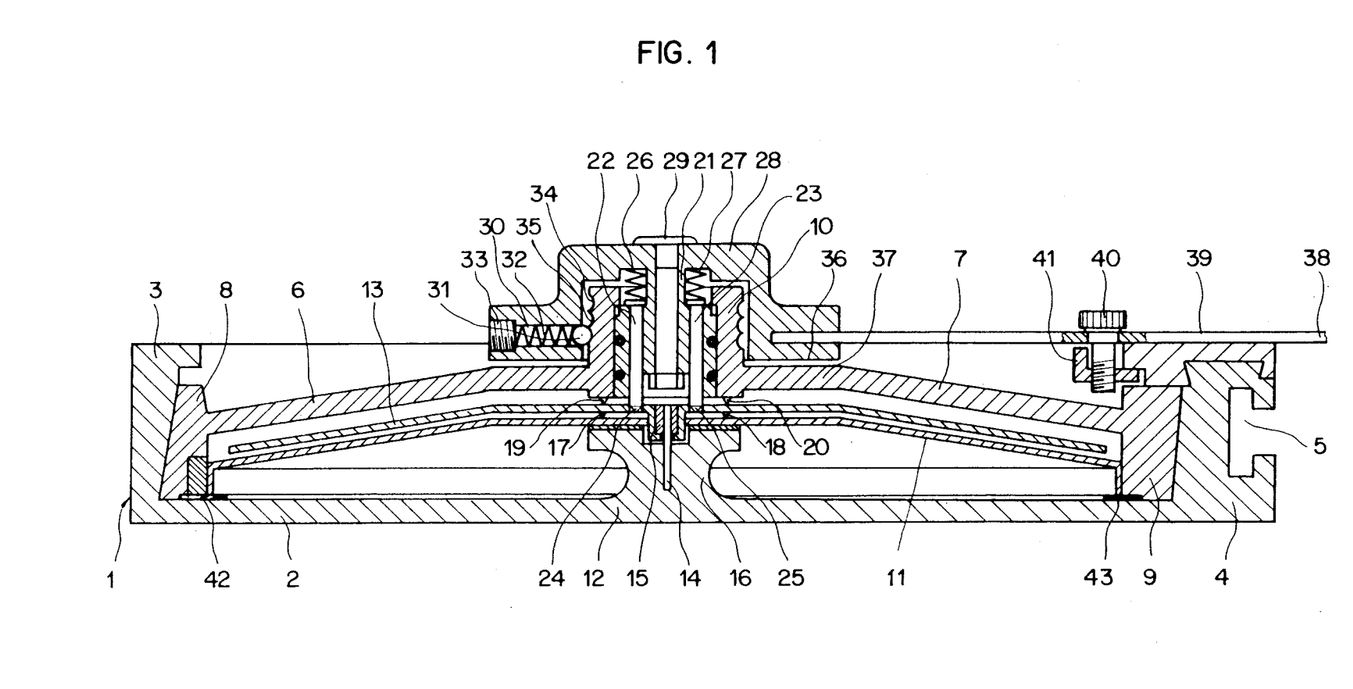
FIG. 1 is a section through the goniometer.

The goniometer shown in section in FIG. 1 comprises a housing 1 having a bottom part 2 and side parts 3 and 4. Side part 4 includes a groove 5 for inserting a rail. A cover part 7, transparent at least in the mid-region 6, is inserted in housing 1. Part 7 is provided with edge portions 8 and 9 resting against side parts 3 and 4 of housing 1. In the mid-region, cover part 7 is provided with an extension 10. Within bottom part 2 of housing 1, as well as of cover part 7, a scale 11 is disposed on a middle portion 12 of bottom part 2. Between scale 11 and cover part 7, a movable pointer arrangement 13 is disposed. Placed upon a spindle 14 provided in middle portion 12 is a ruby rod 15 about which pointer arrangement 13 is rotatingly mounted by means of a center portion 16. On its underside opposite scale 11, pointer arrangement 13 is provided with bearing parts 17 and 18. Extension 10 of cover part 7 is likewise provided at the bottom ends with bearing parts 19 and 20. Disposed within extension 10 is a plug 21 in which two pins 22 and 23 are inserted. Provided in pointer arrangement 13 are two through bores 24 and 25 in which pins 22 and 23 can fit. Pins 22 and 23 are held in plug 21 by means of springs 26 and 27. Concentrically to plug 21 and to extension, 10 of cover part 7, a cylindrical handle or rotatable support 28 is secured to plug 21 with the aid of a fixing bolt 29. On one side of handle 28 there is a bore 30, into the end of which nearest extension 10 a ball 31 biased by a spring 32 is inserted. Set into the outer end of bore 30 is a threaded plug 33 for holding spring 32. On the outside circumference of extension 10, there are two encircling grooves 34 and 35 which ball 31 can engage. In the uppermost position, viz., when ball 31 engages groove 34, pointer arrangement 13 can be freely rotated. In a middle position, viz., when ball 31 engages groove 35, pointer arrangement 13 is braked by the two pins 22 and 23. In the lowest position, when a bottom edge 36 of handle 28 rests upon a horizontal area 37 of cover part 7, pins 22 and 23 come into engagement with through bores 24 and 25, and pointer arrangement 13 can be rotated by means of handle 28. Opposite bore 30, a component 38 for transferring the angular values is inserted into handle 28. Component 38 rests on a support part 39 secured to the top of side part 4 of housing 1. Inserted in component 38 is a locking screw 40 screwed into a locking part 41. When screw 40 is tightened, locking part 41 presses against support part 39, whereby component 38 for transferring angular values is locked in the adjusted position. Disposed between edge portions 8 and 9 of cover part 7 and scale 11 there are gaskets 42 and 43 so that the space between scale 11 and cover part 7 can be filled with a liquid, e.g., oil.

Figure 2:
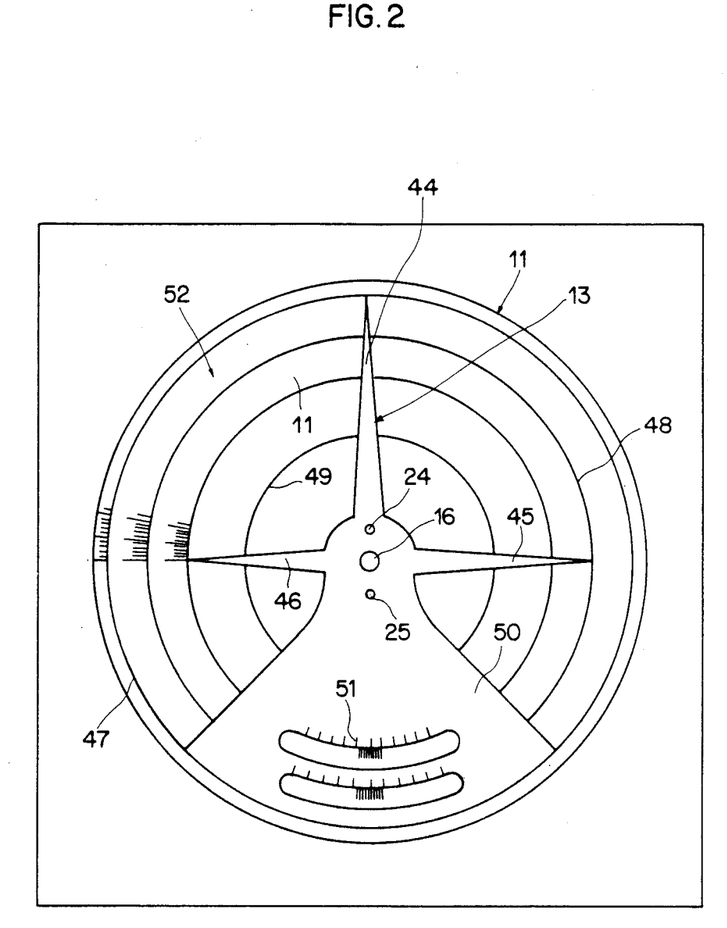
FIG. 2 is a top plan view of the scale and the pointer arrangement of the goniometer.

FIG. 2 is a top plan view of scale 11 and pointer arrangement rotatingly mounted above it. Pointer arrangement 13 has three pointers 44, 45, and 46 disposed at 90° angles to one another. Scale 11 comprises an outer sector 47 graduated in percent, a middle sector 48 graduated in grads, and an inner sector 49 graduated in degrees. At least one vernier scale 51 is inset in a segment-shaped part 50 situated opposite the three pointers 44, 45, and 46. With this pointer design, the segment-shaped part 50 always keeps pointer 44 vertical owing to the force of gravity.

For determining a certain angle of inclination, handle 28 is brought into its uppermost position, i.e., ball 31 snaps into uppermost groove 34. When pointer arrangement 13 has assumed its reading-off position, i.e., when pointer 44 is vertical, handle 28 may be brought into its lowest position so that the two pins 22 and 23 snap into the corresponding through bores 24 and 25. The angle read off can now be transferred outside the goniometer, e.g., onto a drawing sheet, by means of component 38 for transferring angular values 47, 48, 49.

Figure 3:
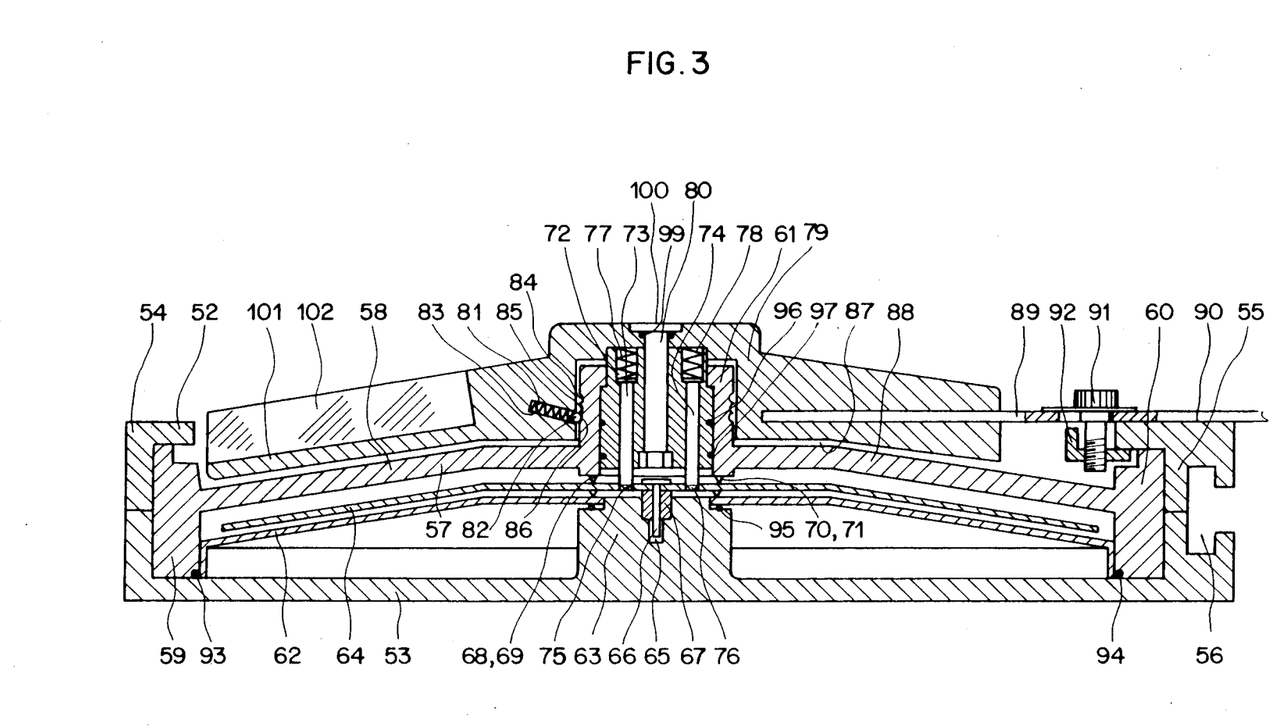
FIG. 3 is a section through a second embodiment of the goniometer.

FIG. 3 shows a section through a second embodiment of the goniometer. It comprises a housing 52 having a bottom part 53 and side parts 54 and 55. Side part 55 includes a groove 56 for inserting a rail. A cover part 58, transparent at least in the mid-region 57, is inserted in housing 52. Part 58 is provided with edge portions 59 and 60 resting against side parts 54 and 55 of housing 52. In the mid-region, cover part 58 is provided with an extension 61. Within bottom part 53 of housing 52, as well as of cover part 58, a scale 62 is disposed on a middle portion 63 of bottom part 53. Between scale 62 and cover part 58, a movable pointer arrangement 64 is disposed. Placed upon a spindle 65 provided in middle portion 63 is a ruby rod 66 about which pointer arrangement 64 is rotatingly mounted by means of a center portion 67. On its underside opposite scale 62, pointer arrangement 64 is provided with bearing parts 68, 69, 70 and 71. Disposed within extension 61 is a plug 72 in which two pins 73 and 74 are inserted. Provided in pointer arrangement 64 are two through bores 75 and 76 in which pins 73 and 74 can fit. Pins 73 and 74 are held in plug 72 by means of springs 77 and 78. Concentrically to plug 72 and to extension 61 of cover part 58, a cylindrical handle 79 is secured to plug 72 with the aid of an arbor 80. On one side of handle 79 there is a bore 81, into the end of which nearest extension 61 a ball 82 biased by a spring 83 is inserted. On the outside circumference of extension 61, there are three encircling grooves 84, 85, and 86 which ball 82 can engage. In the uppermost position, viz., when ball 82 engages groove 84, pointer arrangement 64 can be freely rotated. In a middle position, viz., when ball 82 engages groove 85, pointer arrangement 64 is braked by the two pins 73 and 74. In the lowest position, when a bottom edge 87 of handle 79 rests upon a horizontal area 88 of cover part 58, pins 73 and 74 come into engagement with through bores 75 and 76, and pointer arrangement 64 can be rotated by means of handle 79. Opposite bore 81, a component 89 for transferring the angular values is inserted into handle 79. Component 89 rests on top edge 90 of side part 55 of housing 52. Inserted in component 89 is a locking screw 91 screwed into a locking part 92. When screw 91 is tightened, locking part 92 presses against edge 90, whereby component 89 for transferring angular values is locked in the adjusted position. Disposed between edge portions 59 and 60 of cover part 58 and scale 62 there are gaskets 93 and 94 so that the space between scale 62 and cover part 58 can be filled with a liquid, e.g., oil.

Pins 73 and 74 and through bores 75 and 76 are disposed eccentrically with respect to arbor 80. In middle part 63, an O-ring 95 seals this middle part relative to scale 62. In plug 72 there are two O-rings 96 and 97 which seal plug 72, vertically adjustable by means of handle 79, relative to extension 61 of cover part 58. An O-ring 98 is likewise disposed in the middle region of handle 79, opposite the top edge of plug 72. Furthermore, another O-ring 99 is provided in the upper region of arbor 80. An end part 100, embedded in the top center area of handle 79, rests on O-ring 99 and the top of arbor 80.

A magnifying lens 102 is inset in an extension 101 of handle 79 at a 180° angle from component 89 for transferring the angular values.

Figure 4:
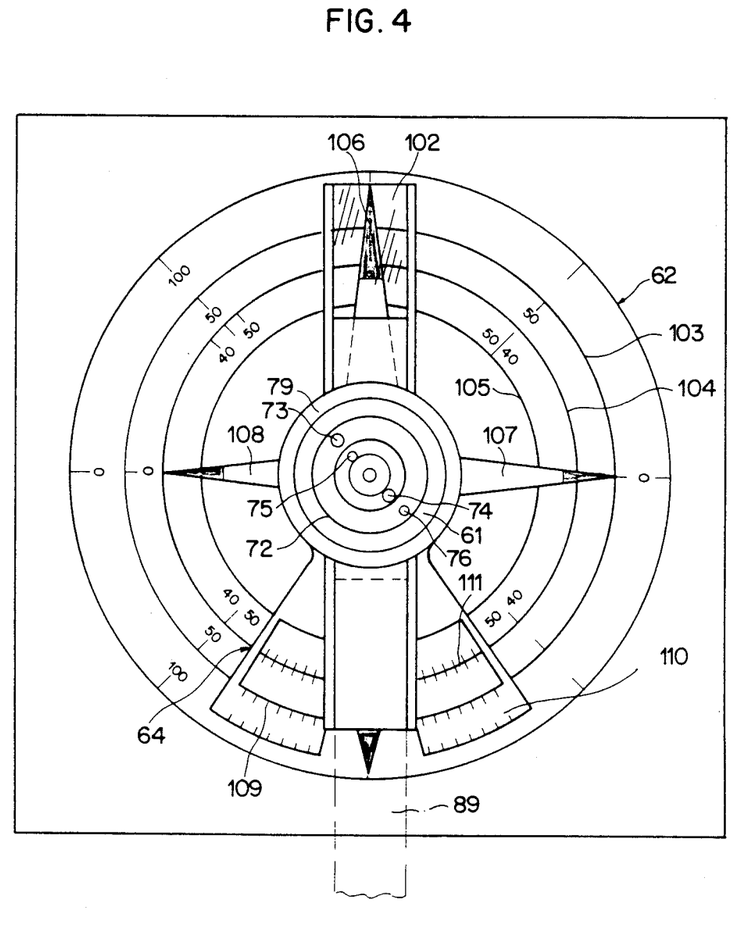
FIG. 4 is a top plan view of the goniometer of FIG. 3, FIGS. 5, 6, and 7 are sections showing three different positions of the handle of the goniometer.

FIG. 4 shows the second embodiment of the goniometer in a top plan view. Scale 62 is divided into three sectors, the outermost sector 103 being graduated in percent, the middle sector 104 in grads, and the inner sector 105 in degrees. This drawing figure also shows the eccentric arrangement of pins 73 and 74 and of bores 75 and 76. An advantage of this arrangement is that in a dial sector of 63°, the pins can snap into the correct position only once. Pointer arrangement 64 has three individual pointers 106, 107, and 108, the longest pointer 106 indicating the angle in percent, the middle pointer 107 in grads, and the shortest pointer 108 in degrees. Opposite the long pointer 106 is a circular segment 109 which causes pointer 106 always to be aligned vertically in the reading position, i.e., when handle 79 is in its uppermost position. In the grad and degree sectors, segment 109 is provided with vernier scales 110 and 111, respectively.

Figure 5:
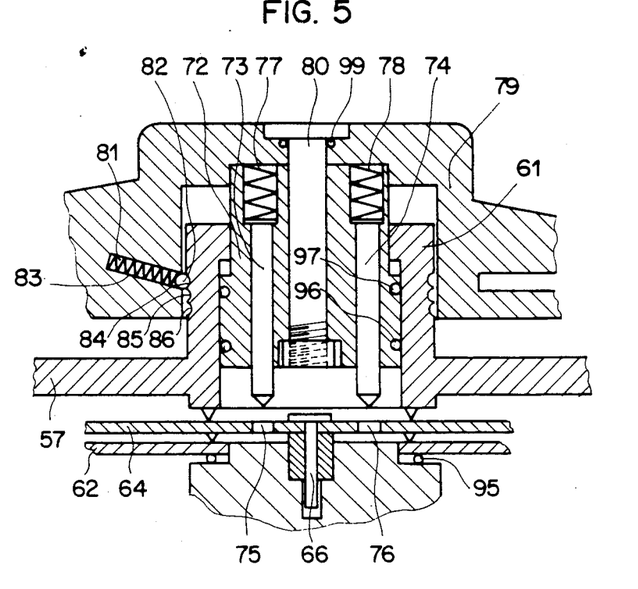
Figure 6:
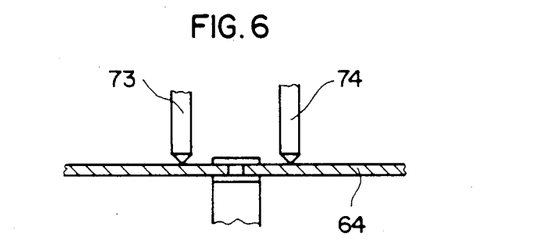
Figure 7:
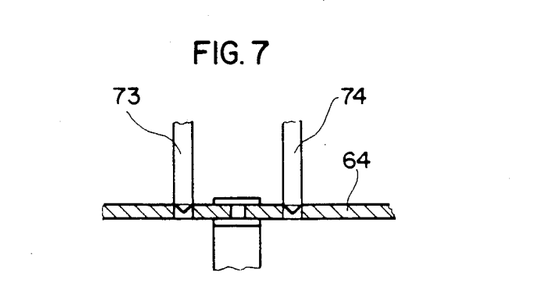

In FIGS. 5, 6, and 7, handle 79 is shown in the uppermost, middle, and lowest positions, respectively. In the uppermost position, ball 82 snaps into uppermost groove 84, in the middle position into middle groove 85, and in the lowest position into groove 86. In the uppermost position, pointer arrangement 64 can rotate freely; in the middle position it is braked at the correct value after hunting; and in the lowest position it is locked by pins 73 and 74 engaging through bores 75 and 76. By means of component 89 for transferring angular values, the angle read off can then be transferred outside the goniometer, e.g., onto a drawing sheet or a workpiece, it also being possible, for instance, to saw a piece of wood in two directly in a saw guided along component 89.

Figure 8:
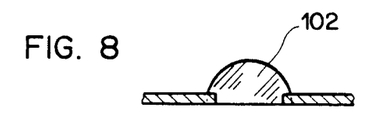
FIG. 8 is a cross-section through the magnifier for reading off the scale values.

FIG. 8 is a cross-section through magnifier 102.

Figure 9:
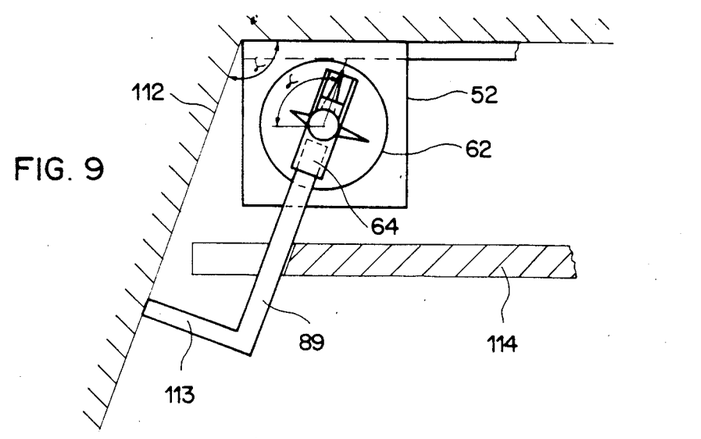
FIGS. 9 and 10 are top plan views of the goniometer during horizontal measurements.
Figure 10:
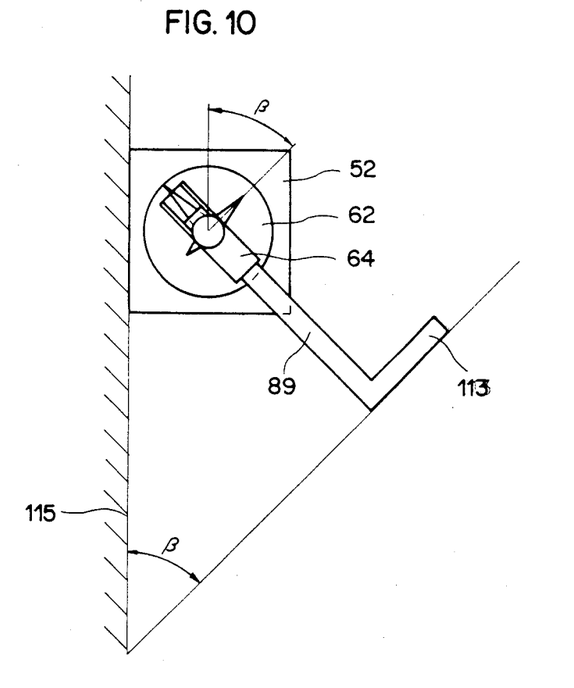

FIGS. 9 and 10 are top plan views of the goniometer during measurements in the horizontal for measuring the angle of an inside wall 112 of a case. Secured at right angles to the outer end of component 89 is a crossbar 113 which is half as long as housing 52 of the goniometer. With the aid of component 89, a piece can be directly sawed off a wooden stick 114 at the desired angle, for example. Angle α of the inside wall 112 is read off between the horizontal, as viewed in FIG. 9, of the goniometer and the position of pointer arrangement 64.

In the arrangement of FIG. 10, an acute angle β of an inside wall 115 of a case is being measured, crossbar 113 likewise being secured at right angles to the end of component 89 for transferring angular values, but with its long side resting against wall 115. It is thereby ensured that component 89 is positioned perpendicular to the wall. Angle β between the inside walls of the case is read off between pointer arrangement 64 and the vertical, as viewed in FIG. 10, of the goniometer.

The goniometer replaces not only a spirit level but also a bevel and a scratch gauge; it combines all these instruments in one. A rail may be inserted in groove 5 or 56 of housing 1 or 52 and fixed to the wall so that the instrument is vertically adjustable. The rail may also be provided with a groove similar to the one in the housing of the goniometer for telescopic insertion of a second rail. The component for transferring angular values is preferably graduated in centimeters and in inches.

Instead of pins 22, 23 or 73, 74 and the matching through bores, suction cups or magnets, for example, might be provided instead.

In the pointer arrangement, preferably in segment-shaped part 50 or 109, a level for indicating the horizontal might additionally be affixed.

The goniometer may be used not only as a measuring instrument and tool but also as an implement for measuring interior and exterior angles, as well as a bevel, scratch gauge, and spirit level.

Figure 11:
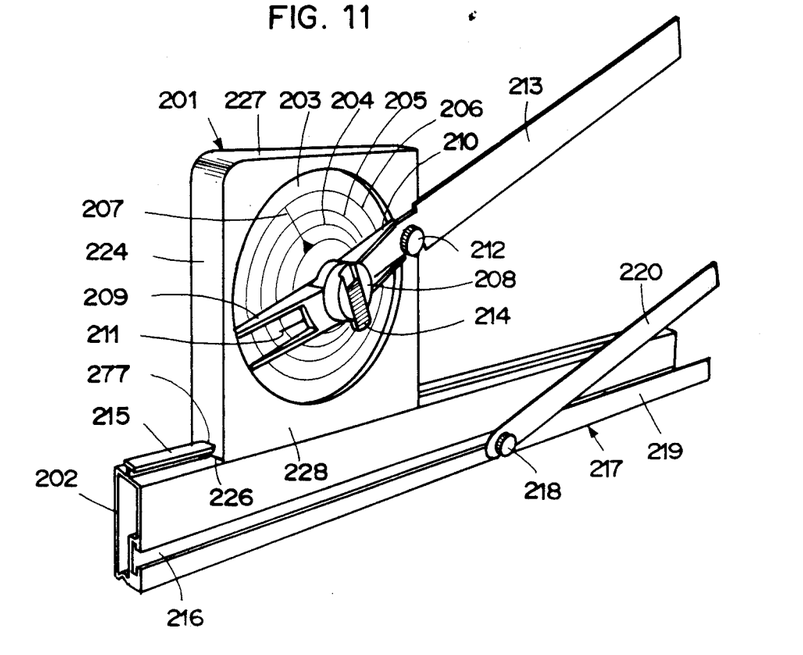
FIG. 11 is a perspective view of a third embodiment of the goniometer mounted on a bar with a measuring rod and an angle gauge.

FIG. 11 is a perspective view of the arrangement of a third embodiment of a goniometer 201 mounted on a measuring bar 202. Goniometer 102 has a scale 203 with three sectors 204, 205, and 206 in degrees, grads, and percent. Above scale 203 there is a pointer arrangement 207. A handle 208 with two extensions 209 and 210 is affixed to a central arbor. Extension 209 is provided in the middle with a locating mark 211, it being possible to insert a magnifying lens in a recess in the extension for better reading off the scale values. A measuring rod 213 is fixed in extension 210 by means of a knurled nut 212. By means of rod 213, the values read off scale 203 can be transferred outside, e.g., to a piece of wood to be cut to size. Handle 208 is provided with a slide 214 by means of which pointer arrangement 207 can be locked via a mechanism when locating mark 211 is situated over a pointer. Goniometer 201 is provided on the underside with a groove 277 by means of which it can be attached to a mounting rail 215 affixed to measuring bar 202. On one side of bar 202 is a longitudinal groove 216 in which an angle gauge 217 is slidingly secured. Angle gauge 217 has two hinged legs 219 and 220 which can be fixed in the adjusted position by means of a knurled nut 218. The angle set with measuring rod 213 can be transferred to angle gauge 217 as will be explained below with reference to FIG. 17.

Figure 12:
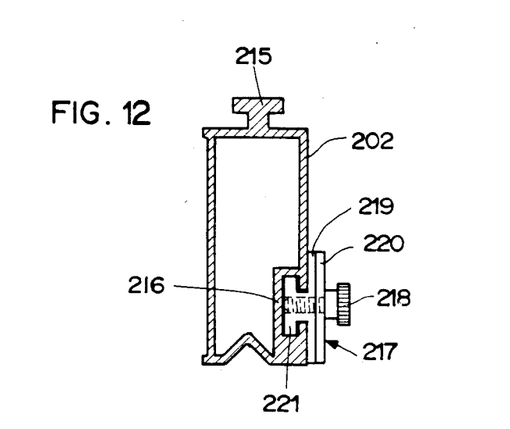
FIG. 12 is a section through the bar of FIG. 11.

FIG. 12 is a cross-section through measuring bar 202 of FIG. 11. Angle gauge 217 can be stored in the hollow interior of bar 202 when not in use. Leg 219 of gauge 217 is provided with a guide rail 221 to be slid into groove 216.

Figure 13:
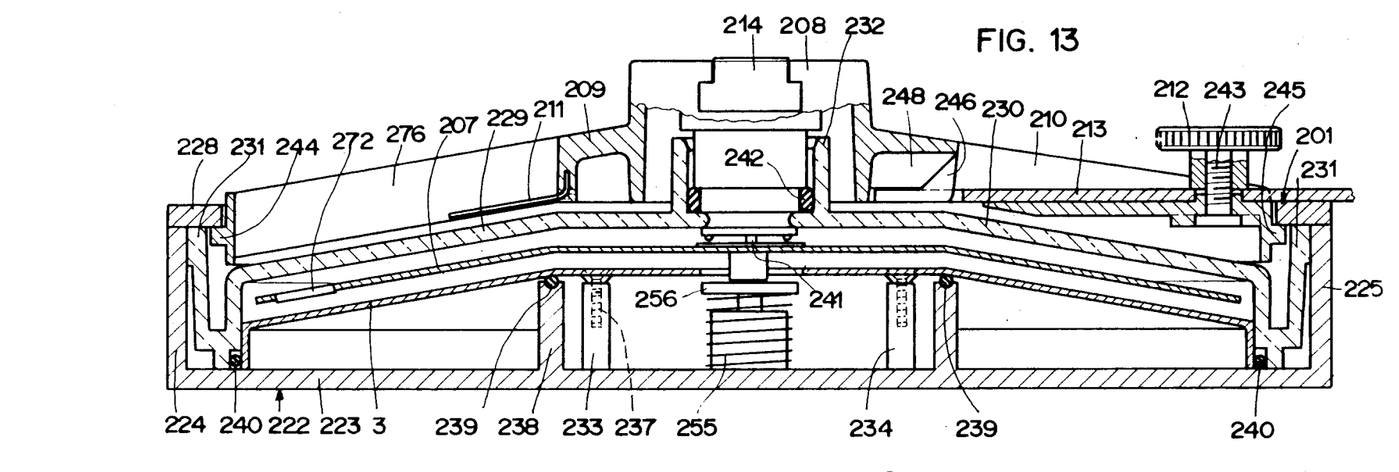
FIG. 13 is a section through the goniometer.

As may be seen in the sectional view of FIG. 13, goniometer 201 has a housing 222 comprising a bottom part 223, side parts 224, 225, 226, 227, and a lid part 228. Side parts 226 and 227 are not visible in FIG. 13. A cover part 230, transparent at least in the mid-region 229, is inserted in housing 222. Part 230 is provided with a cylindrical edge portion 231 resting against the middle portion of side parts 224–227. In the mid-region, cover part 230 is provided with an extension 232. Scale 203 is fixed between bottom part 223 and cover part 230 on pillars 233, 234, 235, and 236 connected to bottom part 223, pillars 234 and 235 not being visible in FIG. 13. Scale 203 is attached to pillars 233–236 by means of screws 237. Affixed outside pillars 233–236 concentrically to the center axis of the goniometer is a hollow cylindrical structure 238 bearing an O-ring 239 at the top. At the end of scale 203 adjacent to edge portion 231 of cover part 230, the scale is sealed off by an O-ring 240 relative to this edge portion. Such sealing is necessary because there is a liquid, e.g., oil, between scale 203 and cover part 230. Pointer arrangement 207 is rotatingly mounted on an arbor 241. A further O-ring 242 rests against extension 232 of cover part 230. Nut 212 for securing measuring rod 213 in extension 210 is screwed onto a screw 243 driven into extension 210. At the outside ends of extensions 209 and 210 of handle 208 are respective ribs 244 and 245 engaged under lid part 228 of housing 222.

Figure 14:
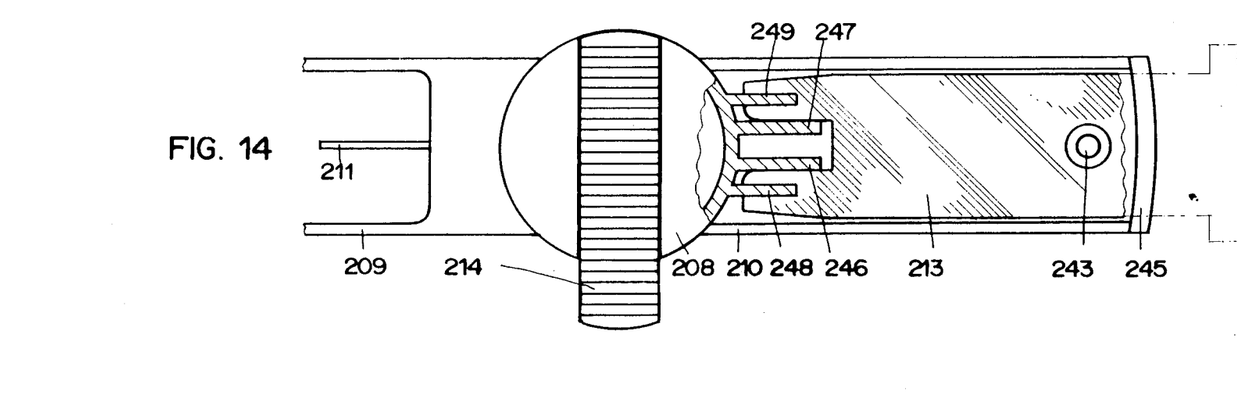
FIG. 14 is a top plan view, partially in section, of the handle and the measuring rod.

FIG. 14 is a top plan view of handle 208 with extensions 209 and 210, partially in section. Handle 208 includes two guide pegs 246 and 247 and two supporting pegs 248 and 249 for guiding and holding measuring rod 213.

Figure 15:
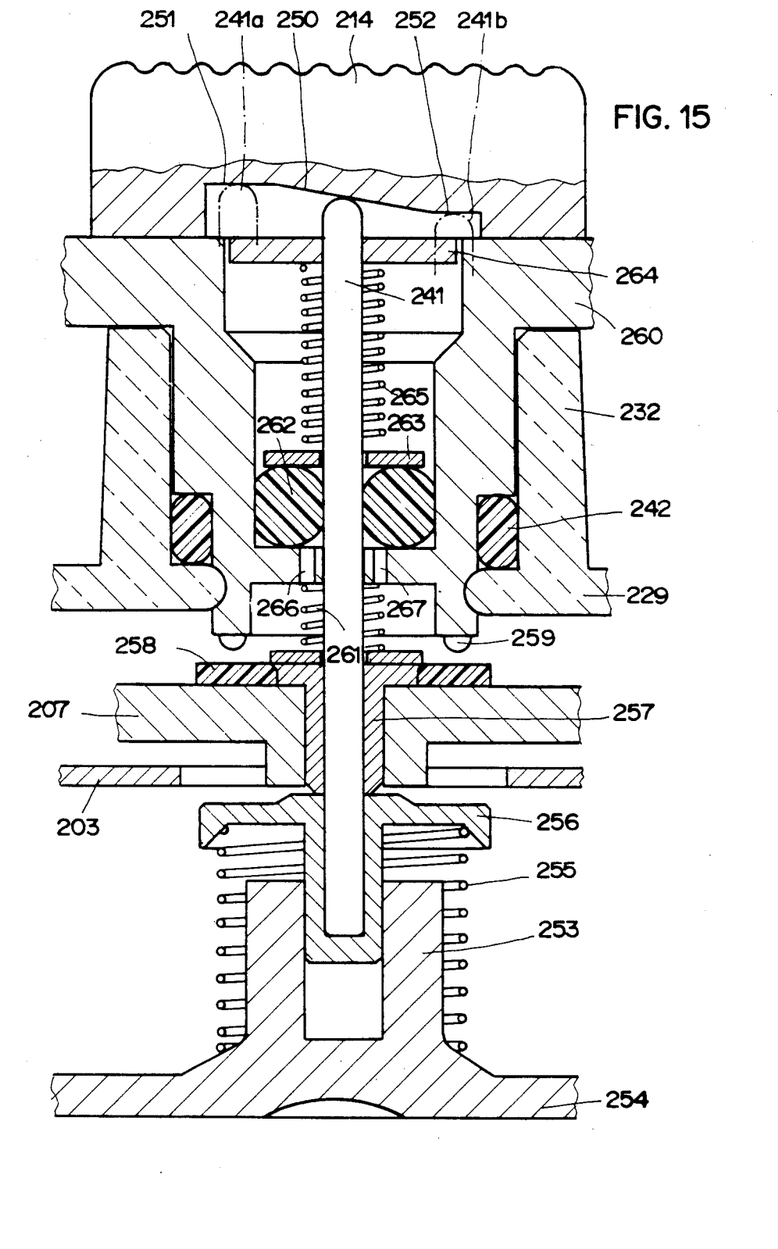
FIG. 15 is a top plan view, partially in section, through the mid-section of the goniometer.

It will be seen from Figure 15, a section through the middle section of goniometer 201, that slide 214 has at the bottom an inclined surface 250 with two flats 251 and 252. As slide 214 moves, arbor 241 is vertically displaced by inclined surface 250, its upper and lower positions being indicated in dot-dash lines, horizontally shifted, as 241a and 241b, respectively. Placed on the upright portion 253 of a pedestal plate 254 is a spring 255 which presses a part 256 connected to arbor 241 vertically upward, so that the top of arbor 241 always rests against inclined surface 250. Pressed into pointer arrangement 207 is a part 257 which is pushed upward by part 256 when arbor 241 is in position 241a. Above pointer arrangement 207 is a rubber washer 258 which comes in contact with an annular shoulder 259 of a rotary part 260 when arbor 241 is in position 241a. Part 260 is turned together with handle 208. Disposed between a bottom face of rotary part 260 and a brass washer resting on part 257 is a spring 261 which presses part 257 against part 256. Within rotary part 260 is an O-ring 262 upon which a brass washer 263 rests. Arbor 241 is connected near the top to a brass washer 264. Between the two brass washers 263 and 264 there is a spring 265 which presses washer 263 onto O-ring 262. When the liquid in the goniometer expands, part of it flows through two bores 266 and 267 into the space between arbor 241 and O-ring 262, the spring packing consisting of O-ring 262, plate 263, and spring 265 being pressed upward, as the case may be. When rubber washer 258 comes in contact with annular shoulder 259, measuring rod 213 is locked with pointer arrangement 207. The angular value read off and set on the scale can then be transferred by the measuring rod to an object outside the goniometer. Instead of rubber washer 258 and annular shoulder 259, locking might also be achieved by means of pins or magnets, for instance.

Figure 16:
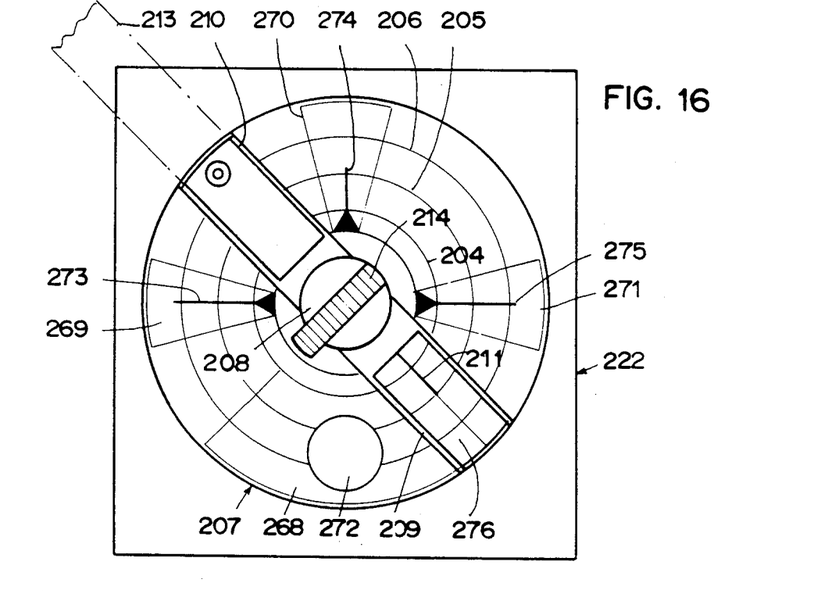
FIG. 16 is a top plan view of the scale of the goniometer.

FIG. 16 is a top plan view of the goniometer. Pointer arrangement 207 is preferably made of transparent plastic and comprises four sectors 268, 269, 270, and 271, a weight 272 being affixed in sector 268 which ensures the vertical positioning of pointer arrangement 207. In each sector 269, 270, and 271 a respective pointer 273, 274, and 275 is marked in ink. When pointer arrangement 207 is freely movable, i.e., when slide 214 is in a position such that arbor 241 is in position 241b, measuring rod 213 can be rotated until locating mark 211 is above, selectively, pointer 273, 274, or 275. Slide 214 is then displaced so that pointer arrangement 207 is no longer freely movable, i.e., so that arbor 241 is moved into position 241a, and rubber washer 258 comes in contact with cylindrical shoulder 259 (see FIG. 15). A lens 276 is affixed in extension part 209 for better reading of scale values 204, 205, and 206.

Figure 17:
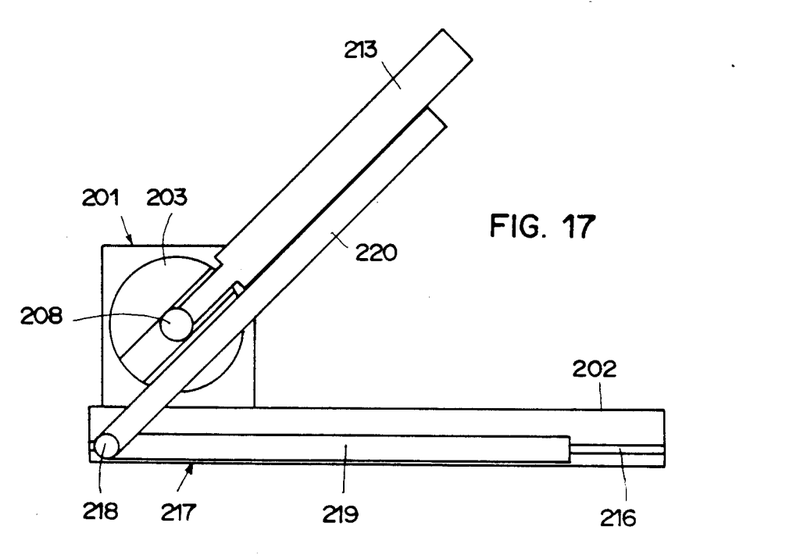
FIG. 17 is a diagrammatic view of the goniometer mounted on the measuring bar with the angle gauge inserted in the bar.

FIG. 17 illustrates another possibility of use of angle gauge 217. This gauge is pushed along groove 216 of measuring bar 202 until leg 220 rests against measuring rod 213. Next, the two legs 219 and 220 of gauge 217 are fixed by means of nut 218. Angle gauge 217 can then be pulled out of groove 216 and the adjusted angle transferred to a workpiece.

What is claimed is:

1. In a goniometer of the type having a housing and a scale indicating angular values associated with the housing, comprising:

(a) a pointer arrangement pivotingly mounted to said goniometer housing adjacent to said scale, the pointer arrangement having at least one indicating means wherein the indicating means is operable to move to a position corresponding to a vertical direction due to the effect of gravity, and the indicating means aligns with one of said angular values on the scale which provides the angular displacement between the goniometer housing and a vertical position, (b) a rotatable support including means for pivotingly attaching said support to said goniometer housing whereby said rotatable support is rotatable with respect to both said goniometer housing and said pointer arrangement, and (c) a transfer component secured to said rotatable support and projecting beyond said goniometer housing, the transfer component being capable of transferring said one of said angular values from said pointer arrangement to an external item.

2. The goniometer of claim 1, wherein said scale includes a sector graduated in percent, a sector graduated in grads, and a sector graduated in degrees.

3. The goniometer of claim 1, wherein said pointer arrangement comprises three pointers.

4. The goniometer of claim 1, further comprising a magnifying lens attached to said rotatable support opposite to said transfer component.

5. The goniometer of claim 1, wherein said pointer arrangement includes at least one vernier scale.

6. The goniometer of claim 1, further comprising locking means disposed in said rotatable support for selectively locking and releasing said transfer component together with said pointer arrangement.

7. The goniometer of claim 6, wherein said locking means comprises a movable actuating part with an inclined surface and an arbor in contact with said inclined surface of the actuating part, wherein said arbor is vertically displaceable by operation of said actuating part due to movement of said inclined surface, said pointer arrangement becoming engaged with and disengaged from said support upon vertical displacement of said arbor.

8. The goniometer of claim 7, further comprising a rubber washer disposed on said pointer arrangement adjacent to said arbor, wherein said support further comprises a rotary part for engaging said rubber washer such that when said rotary part is engaged with said rubber washer the contact of said rotary part against said rubber washer frictionally engages the pointer arrangement and the transfer component together, through said support, to inhibit the pointer arrangement from freely pivoting.

9. The goniometer of claim 1, further comprising a bar and connection means for detachably connecting said goniometer to said bar.

10. The goniometer of claim 1 further comprising a bar, said bar comprising a first connecting means for detachably connecting said bar to said goniometer housing.

11. The goniometer of claim 9, wherein said bar comprises a second connection means for detachably connecting said bar to an angle gauge.

12. In a goniometer of the type having a housing and a scale disposed within the housing, the improvement comprising:

(a) a pointer arrangement pivotingly mounted to said goniometer housing adjacent to said scale, said pointer arrangement having at least one pointer end wherein said pointed end points in a vertical direction, and said point end points to a number on the scale indicating an angular displacement value between the goniometer housing and a vertical position;

(b) a handle comprising attaching means for pivotingly attaching said handle to said goniometer housing, whereby said handle is rotatable with respect to both said goniometer housing and said pointer arrangement, said attaching means allowing said handle to move between a first position and a second position, whereby in said first position the pointer arrangement is free to pivot and whereby in said second position, the handle prevents the pointer arrangement from freely pivoting relative to said goniometer housing, the handle further comprising a rotary part adjacent to the pointer arrangement;

(c) a transfer component attached to said handle and projecting beyond said goniometer housing, said transfer component capable of transferring said angular displacement value from said pointer arrangement to an external item, (d) locking means disposed in said handle for selectively locking and releasing said transfer component together with said pointer arrangement, said locking means including a surface inclined relative to said housing, and an arbor vertically displaceable by operation of said actuating part, said pointer arrangement becoming engaged with and disengaged from said handle upon vertical displacement of said arbor; and, (e) a rubber washer disposed on said pointer arrangement adjacent to said rotary part of said handle, the rotary part of the handle being displaceable such that when the handle is moved to the second position, the rotary part engages the rubber washer whereby the pointer arrangement and the transfer component, through said handle, are locked together.

13. A goniometer comprising:

(a) a housing including a scale;

(b) a pointer including a first indicating means, said pointer being operable such that when the pointer is allowed to pivot freely, the indicating means of the pointer will correspond to a vertical direction and indicate the angular value of displacement between the housing and the vertical direction;

(c) a rotatable support;

(d) an attaching means for pivotally attaching said pointer and said support to said housing, wherein the attaching means includes a locking mechanism such that when the support is placed in a first position, the attaching means allows the pointer to freely pivot relative to the housing, and when the support is placed in a second position, the attaching means prevents the pointer from freely pivoting relative to the housing; and, (e) a transfer component attached to the support and extending beyond the housing, the transfer component being adapted for transferring the angle indicated by the pointer to an external item.

14. The goniometer of claim 13 wherein the scale comprises three sectors graduated in degrees, grads, and percent such that the angular value indicated by the pointer may be read in degrees, grads, and percent.

15. The goniometer of claim 13 wherein the pointer includes a second and third indicating means disposed 90 degrees from the first indicating means.

16. The goniometer of claim 13 further comprising a bar detachably connected to the housing and an angle gauge detachably connected to said bar, wherein the bar is parallel to the housing, and the angle gauge has a side parallel to the bar.

* * * * *

UNITED STATES PATENT AND TRADEMARK OFFICE
CERTIFICATE OF CORRECTION

PATENT NO. : 4,974,329

DATED : December 4, 1990

INVENTOR(S) : Siegfried Willa

It is certified that error appears in the above—identified patent and that said Letters Patent is hereby corrected as shown below:

On the title page:

In the Abstract, line 9, "(211is" should be -- (211) is --.

Column 2, line 13, delete the comma after "extension".

Column 7, line 48 (line 1 of claim 11), "9" should be -- 10 --; line 58 (line 8 of claim 12), "point" should be -- pointed --.

Signed and Sealed this

Seventh Day of April, 1992

Attest:

HARRY F. MANBECK, JR.

Attesting Officer

Commissioner of Patents and Trademarks